US012080956B2

(12) United States Patent
Chang et al.

(10) Patent No.: US 12,080,956 B2
(45) Date of Patent: Sep. 3, 2024

(54) MOBILE DEVICE WITH HIGH RADIATION EFFICIENCY

(71) Applicant: Acer Incorporated, New Taipei (TW)

(72) Inventors: Kun-Sheng Chang, New Taipei (TW); Ching-Chi Lin, New Taipei (TW); Chuan-Chun Wang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 262 days.

(21) Appl. No.: 17/818,776

(22) Filed: Aug. 10, 2022

(65) Prior Publication Data

US 2023/0411845 A1 Dec. 21, 2023

(30) Foreign Application Priority Data

Jun. 20, 2022 (TW) ................................ 111122782

(51) Int. Cl.
*H01Q 5/307* (2015.01)
*H01Q 1/22* (2006.01)
*H01Q 9/42* (2006.01)

(52) U.S. Cl.
CPC ............... *H01Q 5/307* (2015.01); *H01Q 1/22* (2013.01); *H01Q 9/42* (2013.01)

(58) Field of Classification Search
CPC ............ H01Q 5/307; H01Q 1/22; H01Q 9/42; H01Q 1/243; H01Q 1/36
See application file for complete search history.

(56) References Cited

U.S. PATENT DOCUMENTS

| | | | | |
|---|---|---|---|---|
| 8,368,598 B2 | 2/2013 | Kuo et al. | | |
| 11,380,977 B2 | 7/2022 | Chang et al. | | |
| 2018/0026355 A1* | 1/2018 | Lee | ........................ | H01Q 1/243 343/770 |
| 2022/0085483 A1* | 3/2022 | Chang | .................... | H01Q 5/307 |

FOREIGN PATENT DOCUMENTS

| | | |
|---|---|---|
| TW | 201128857 A | 8/2011 |
| TW | 202211541 A | 3/2022 |
| TW | 202211544 A | 3/2022 |

OTHER PUBLICATIONS

Chinese language office action dated Jul. 28, 2023, issued in application No. TW 111122782.

* cited by examiner

*Primary Examiner* — David E Lotter
(74) *Attorney, Agent, or Firm* — McClure, Qualey & Rodack, LLP

(57) ABSTRACT

A mobile device with high radiation efficiency includes a ground element, a first radiation element, a second radiation element, a third radiation element, a fourth radiation element, a dielectric substrate, a speaker body, and a cable. The first radiation element and the fourth radiation element are coupled to the ground element. The second radiation element and the third radiation element are coupled to a feeding point. An antenna structure is formed by the first radiation element, the second radiation element, the third radiation element, and the fourth radiation element. The speaker body has a first vertical projection on the dielectric substrate, and the first vertical projection at least partially overlaps the third radiation element. The cable is coupled to the speaker body. The cable has a second vertical projection on the dielectric substrate, and the second vertical projection does not overlap the antenna structure at all.

15 Claims, 5 Drawing Sheets

MOBILE DEVICE WITH HIGH RADIATION EFFICIENCY

CROSS REFERENCE TO RELATED APPLICATIONS

This application claims priority of Taiwan Patent Application No. 111122782 filed on Jun. 20, 2022, the entirety of which is incorporated by reference herein.

BACKGROUND OF THE INVENTION

Field of the Invention

The disclosure generally relates to a mobile device, and more particularly, it relates to a mobile device and its antenna structure with high radiation efficiency.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

Antennas are indispensable elements in mobile devise supporting wireless communication. However, some metal elements or circuit elements in mobile device may negatively affect the radiation efficiency of antennas, thereby degrading the overall communication quality of the mobile devices. As a result, there is a need to propose a novel mobile device with a novel antenna structure, so as to overcome the problems of the prior art.

BRIEF SUMMARY OF THE INVENTION

In an exemplary embodiment, the disclosure is directed to a mobile device high radiation efficiency. The mobile device includes a ground element, a first radiation element, a second radiation element, a third radiation element, a fourth radiation element, a dielectric substrate, a speaker body, and a cable. The first radiation element is coupled to the ground element. The second radiation element is coupled to a feeding point. The third radiation element is coupled to the feeding point. The fourth radiation element is coupled to the ground element. An antenna structure is formed by the first radiation element, the second radiation element, the third radiation element, and the fourth radiation element. The first radiation element, the second radiation element, the third radiation element, and the fourth radiation element are disposed on the dielectric substrate. The speaker body has a first vertical projection on the dielectric substrate, and the first vertical projection at least partially overlaps the third radiation element. The cable is coupled to the speaker body. The cable has a second vertical projection on the dielectric substrate, and the second vertical projection does not overlap the antenna structure at all.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
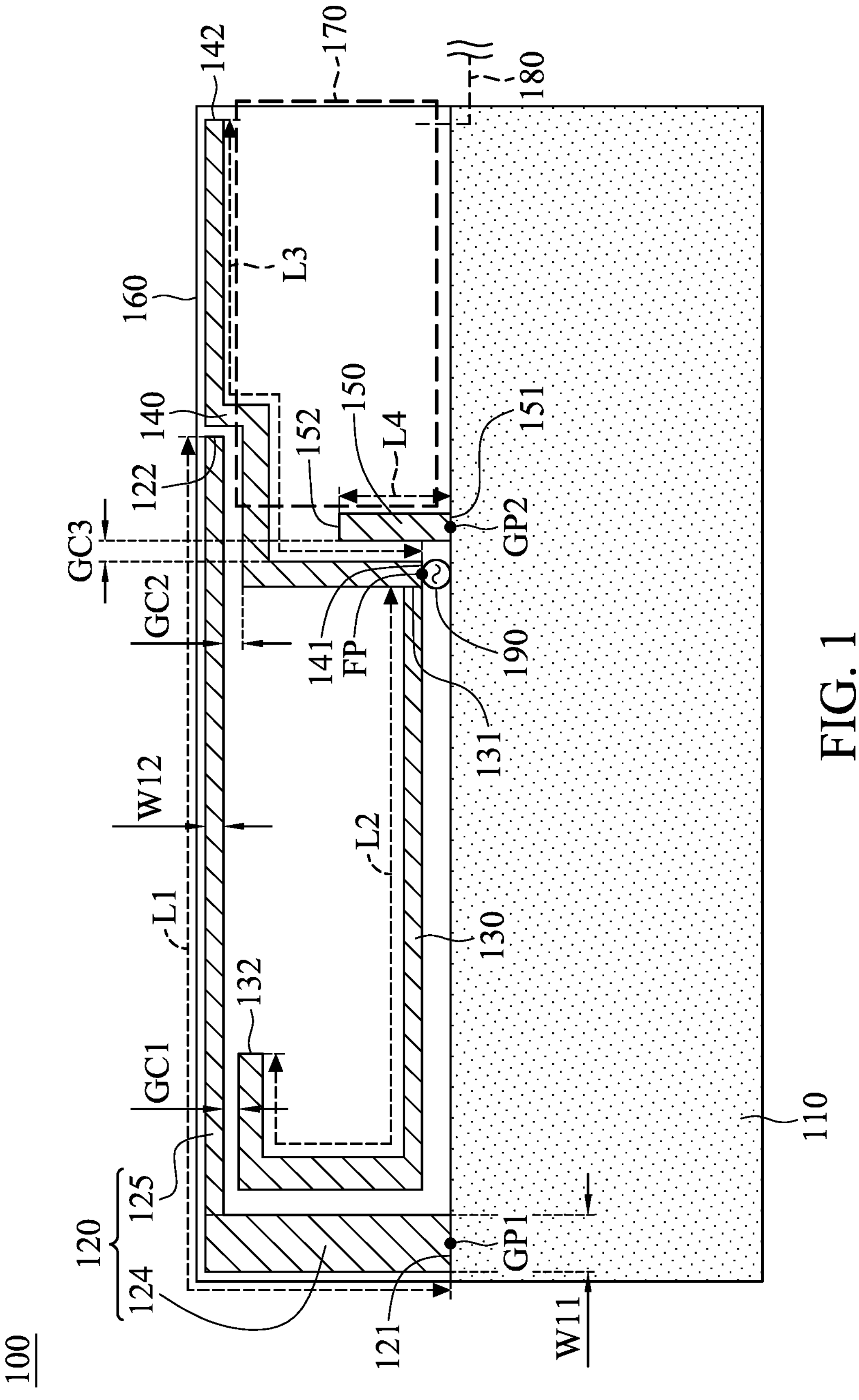
FIG. 1 is a top view of a mobile device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s)

as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top view of a mobile device 100 according to an embodiment of the invention. For example, the mobile device 100 may be a smart phone, a tablet computer, or a notebook computer. In the embodiment of FIG. 1, the mobile device 100 includes a ground element 110, a first radiation element 120, a second radiation element 130, a third radiation element 140, a fourth radiation element 150, a dielectric substrate 160, a speaker body 170, and a cable 180. The ground element 110, the first radiation element 120, the second radiation element 130, the third radiation element 140, the fourth radiation element 150 may all be made of metal materials, such as copper, silver, aluminum, iron, or their alloys. It should be understood that the mobile device 100 may further include other components, such as a processor, a touch control panel, a speaker, a battery module, and a housing, although they are not displayed in FIG. 1.

The ground element 110 may be implemented with a ground copper foil, which can provide a ground voltage. For example, the ground element 110 may be coupled to a system ground plane (not shown) of the mobile device 100.

The first radiation element 120 may substantially have a variable-width L-shape. Specifically, the first radiation element 120 has a first end 121 and a second end 122. The first end 121 of the first radiation element 120 is coupled to a first grounding point GP1 on the ground element 110. The second end 122 of the first radiation element 120 is an open end. In some embodiments, the first radiation element 120 includes a wide portion 124 adjacent to the first end 121 and a narrow portion 125 adjacent to the second end 122, and the narrow portion 125 is coupled through the wide portion 124 to the first grounding point GP1. It should be noted that the term "adjacent" or "close" over the disclosure means that the distance (spacing) between two corresponding elements is smaller than a predetermined distance (e.g., 10 mm or shorter), or means that the two corresponding elements directly touch each other (i.e., the aforementioned distance/spacing therebetween is reduced to 0).

The second radiation element 130 may substantially have a J-shape. Specifically, the second radiation element 130 has a first end 131 and a second end 132. The first end 131 of the second radiation element 130 is coupled to a feeding point FP. The second end 132 of the second radiation element 130 is an open end. The feeding point FP may be further coupled to a signal source 190. For example, the signal source 190 may be an RF (Radio Frequency) module. In some embodiments, the second radiation element 130 is adjacent to the first radiation element 120, and a first coupling gap GC1 is formed between the first radiation element 120 and the second radiation element 130.

The third radiation element 140 may substantially have a W-shape. Specifically, the third radiation element 140 has a first end 141 and a second end 142. The first end 141 of the third radiation element 140 is coupled to the feeding point FP. The second end 142 of the third radiation element 140 is an open end. For example, the second end 122 of the first radiation element 120, the second end 132 of the second radiation element 130, and the second end 142 of the third radiation element 140 may substantially extend in the same direction. In some embodiments, the third radiation element 140 is adjacent to the first radiation element 120, and a second coupling gap GC2 is formed between the first radiation element 120 and the third radiation element 140.

The fourth radiation element 150 may substantially have a straight-line shape. Specifically, the fourth radiation element 150 has a first end 151 and a second end 152. The first end 151 of the fourth radiation element 150 is coupled to a second grounding point GP2 on the ground element 110. The second end 152 of the fourth radiation element 150 is an open end. For example, the second grounding point GP2 and the first grounding point GP1 may be at different positions on the ground element 110. In some embodiments, the fourth radiation element 150 is adjacent to the third radiation element 140, and a third coupling gap GC3 is formed between the third radiation element 140 and the fourth radiation element 150.

In a preferred embodiment, an antenna structure of the mobile device 100 is formed by the first radiation element 120, the second radiation element 130, the third radiation element 140, and the fourth radiation element 150.

The dielectric substrate 160 may be an FR4 (Flame Retardant 4) substrate, a PCB (Printed Circuit Board), or an FPC (Flexible Printed Circuit). The first radiation element 120, the second radiation element 130, the third radiation element 140, and the fourth radiation element 150 may all be disposed on the same surface of the dielectric substrate 160.

For example, the speaker body 170 may be considered as a relatively large inductive element, and the cable 180 may be a twisted pair coupled to the speaker body 170. The speaker body 170 has a first vertical projection on the dielectric substrate 160, and the first vertical projection at least partially overlaps the third radiation element 140 and/or the fourth radiation element 150. However, the first vertical projection of the speaker body 170 neither overlaps the first radiation element 120 nor overlaps the second radiation element 130. In addition, the cable 180 has a second vertical projection on the dielectric substrate 160, and the second vertical projection does not overlap the first radiation element 120 at all, the second radiation element 130, the third radiation element 140, and the fourth radiation element 150 of the antenna structure at all. With such a design, the existences of the speaker body 170 and the cable 180 almost do not negatively affect the radiation performance of the antenna structure of the mobile device 100, and the proposed design has the advantages of reducing the overall size and improving communication quality.

The following embodiments will introduce other different configurations and detailed structural features of the mobile device 100. It should be understood that these figures and descriptions are merely exemplary, rather than limitations of the invention.

Figure 2:
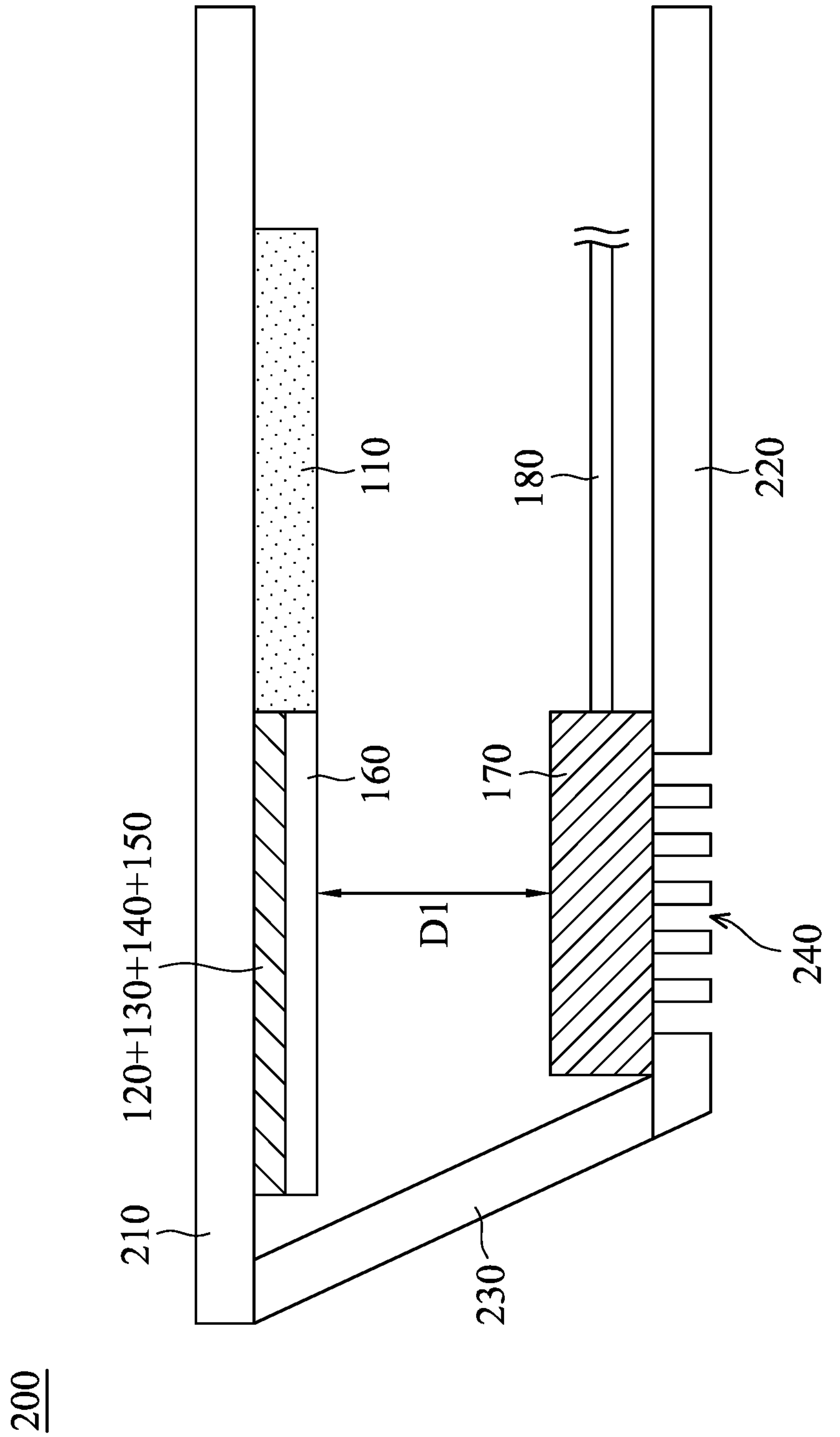
FIG. 2 is a sectional view of a mobile device according to an embodiment of the invention.

FIG. 2 is a sectional view of a mobile device 200 according to an embodiment of the invention. FIG. 2 is similar to FIG. 1. In the embodiment of FIG. 2, the mobile device 200 is a notebook computer, and it further includes a keyboard frame 210, a base housing 220, and a sidewall 230. The sidewall 230 is connected between the keyboard frame 210 and the base housing 220. It should be understood that the keyboard frame 210 and the base housing 220 are equivalent to the so-called "C-component" and "D-component" in the field of notebook computers, respectively. Generally, the ground element 110, the first radiation element 120, the second radiation element 130, the third radiation element 140, and the fourth radiation element 150 of the antenna structure, and the dielectric substrate 160 are all adjacent to the keyboard frame 210. The speaker body 170 and the cable 180 are adjacent to the base housing 220. The base housing 220 may further have a plurality of sound holes 240. In some embodiments, the distance D1 between the speaker body 170 and the antenna structure of the mobile device 200 is longer than or equal to 3 mm, and it can prevent the speaker body 170 from interfering with the radiation pattern of the antenna structure. Other features of the mobile device 200 of FIG. 2 are similar to those of the mobile device 100 of FIG. 1. Accordingly, the two embodiments can achieve similar levels of performance.

Figure 3:
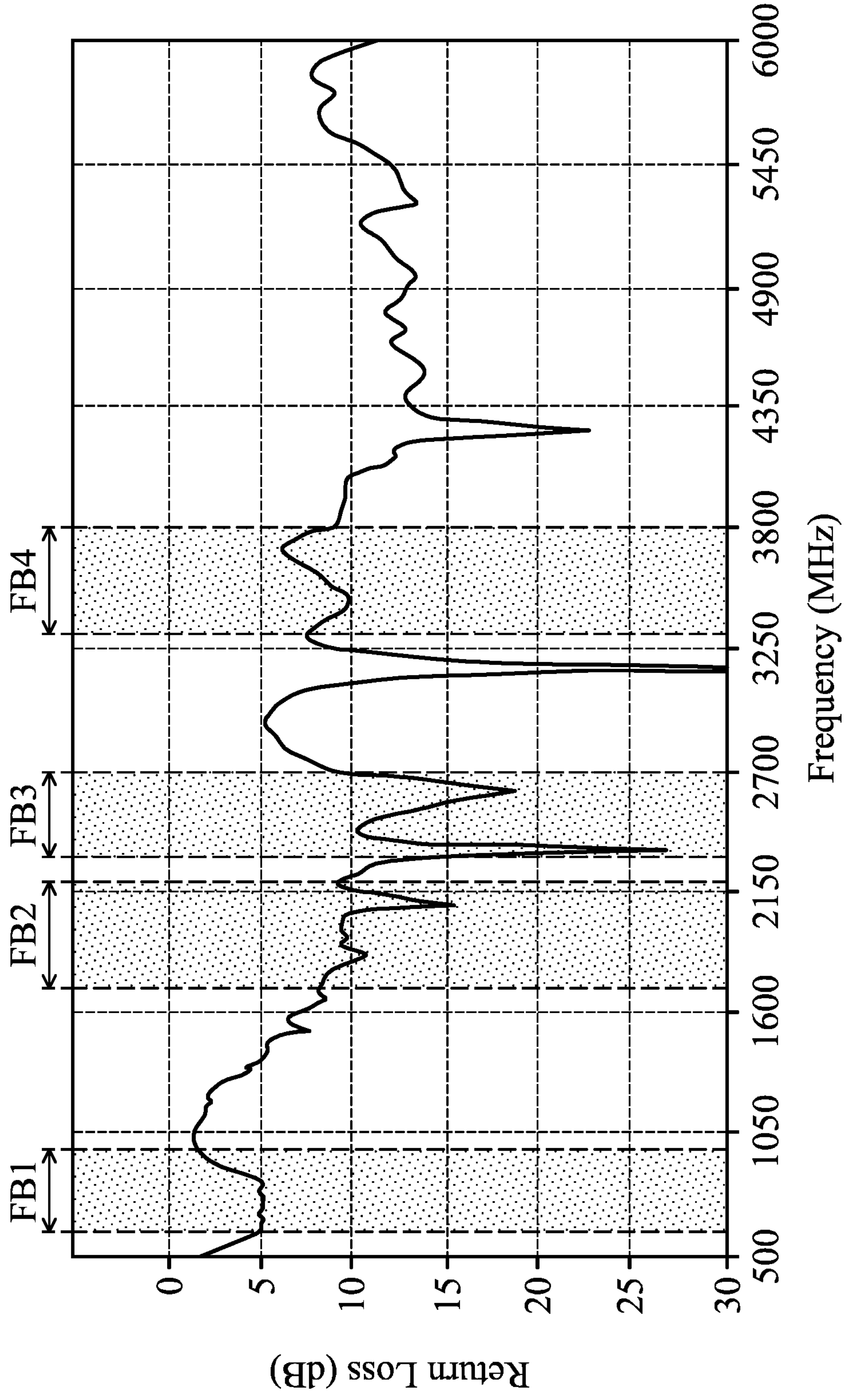
FIG. 3 is a diagram of return loss of an antenna structure when a mobile device is not used together with a speaker body and the cable, according to an embodiment of the invention.
Figure 4:
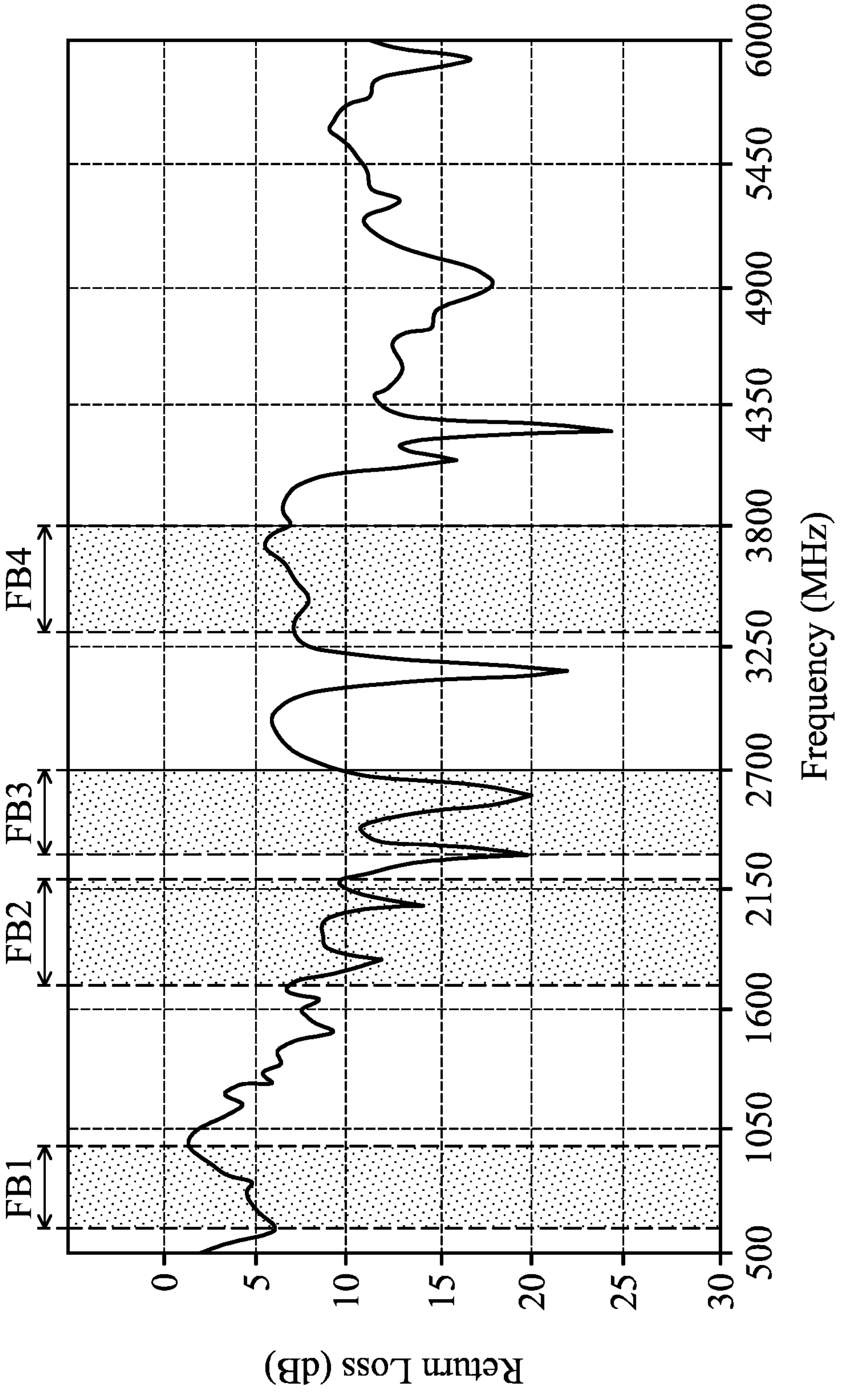
FIG. 4 is a diagram of return loss of an antenna structure when a mobile device is used together with a speaker body and a cable, according to an embodiment of the invention.

FIG. 3 is a diagram of return loss of the antenna structure when the mobile device 100 is not used together with the speaker body 170 and the cable 180, according to an embodiment of the invention. FIG. 4 is a diagram of return loss of the antenna structure when the mobile device 100 is used together with the speaker body 170 and the cable 180, according to an embodiment of the invention. The horizontal axis represents the operational frequency (MHz). The vertical axis represents the return loss (dB). According to the measurements of FIG. 3 and FIG. 4, no matter whether the speaker body 170 and the cable 180 are used, the antenna structure of the mobile device 100 can cover a first frequency band FB1, a second frequency band FB2, a third frequency band FB3, and a fourth frequency band FB4. For example, the first frequency band FB1 may be from 600 MHz to 960 MHz, the second frequency band FB2 may be from 1710 MHz to 2170 MHz, the third frequency band FB3 may be from 2300 MHz to 2700 MHz, and the fourth frequency band FB4 may be from 3300 MHz to 3800 MHz. Accordingly, the antenna structure of the mobile device 100 can support at least the wideband operations of LTE (Long Term Evolution), and its radiation performance will not be negatively affected so much by the speaker body 170 and the cable 180.

With the antenna theory, each the first radiation element 120 and the second radiation element 130 is excited to generate a fundamental resonant mode, thereby forming the first frequency band FB1. In addition, the first radiation element 120 is further excited to generate a higher-order resonant mode, thereby forming the third frequency band FB3. The third radiation element 140 is excited to generate the second frequency band FB2. The fourth radiation element 150 is excited to generate the fourth frequency band FB4.

Figure 5:
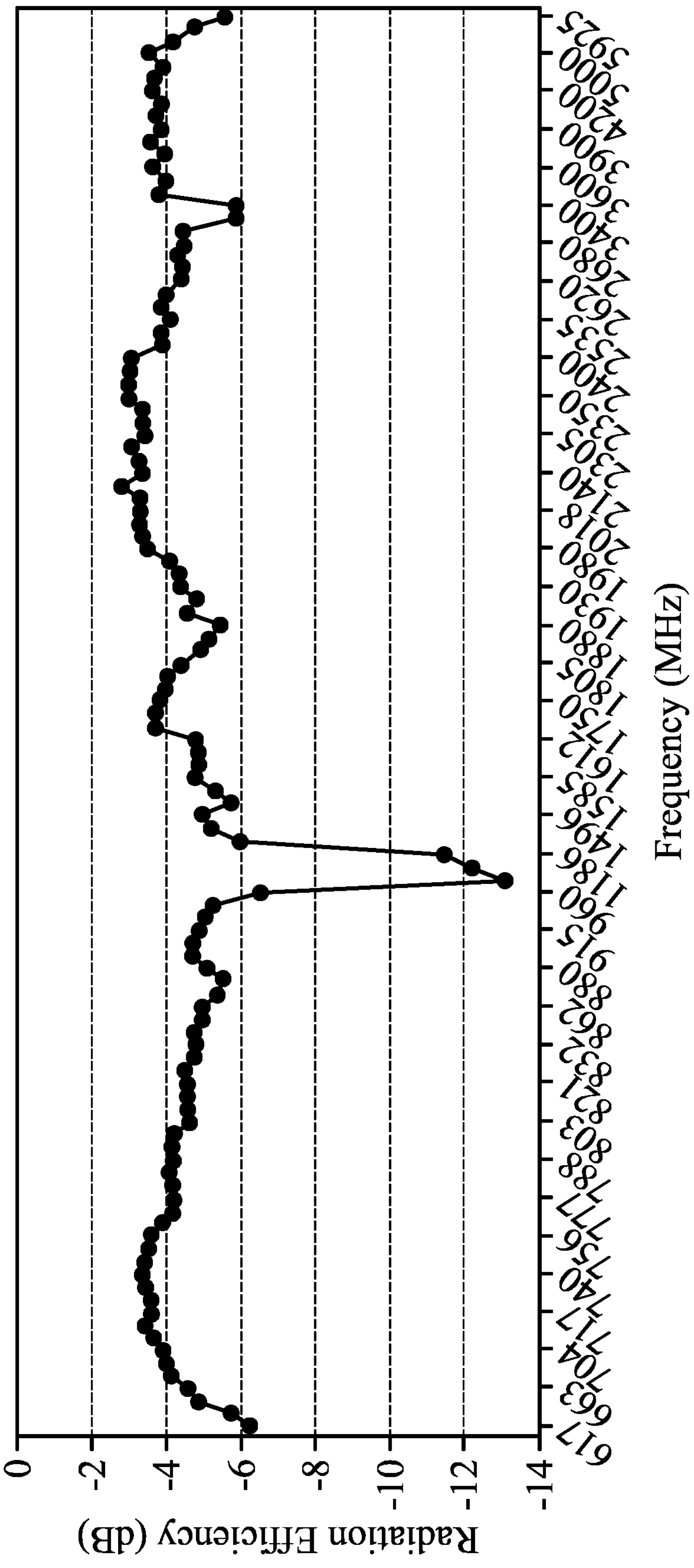
FIG. 5 is a diagram of radiation efficiency of an antenna structure when a mobile device is used together with a speaker body and a cable, according to an embodiment of the invention.

FIG. 5 is a diagram of radiation efficiency of the antenna structure when the mobile device 100 is used together with the speaker body 170 and the cable 180, according to an embodiment of the invention. The horizontal axis represents the operational frequency (MHz). The vertical axis represents the radiation efficiency (dB). According to the measurement of FIG. 5, the antenna structure of the mobile device 100 can meet the requirements of practical applications of general mobile communication devices.

In some embodiments, the element sizes of the mobile device 100 will be described as follows. The length L1 of the first radiation element 120 may be substantially equal to 0.25 wavelength (λ/4) of the lowest frequency of the first frequency band FB1. The length L2 of the second radiation element 130 may be substantially equal to 0.25 wavelength (λ/4) of the highest frequency of the first frequency band FB1. In the first radiation element 120, the width W11 of the wide portion 124 may be from 3 mm to 4 mm, and the width W12 of the narrow portion 125 may be from 1 mm to 2 mm. The length L3 of the third radiation element 140 may be substantially equal to 0.25 wavelength (λ/4) of the second frequency band FB2. The length L4 of the fourth radiation element 150 may be substantially equal to 0.25 wavelength (λ/4) of the fourth frequency band FB4. The width of each of the first coupling gap GC1, the second coupling gap GC2, and the third coupling gap GC3 may be from 0.5 mm to 2 mm. The above ranges of element sizes are calculated and obtained according to the results of many experiments, and they help to optimize the operational bandwidth and impedance matching of the antenna structure of the mobile device 100.

The invention proposes a novel mobile device. Compared to the conventional design, the invention has at least the advantages of integration with speakers, small size, wide bandwidth, and good communication quality, and therefore it is suitable for application in a variety of mobile communication devices.

Note that the above element sizes, element shapes, and frequency ranges are not limitations of the invention. An antenna designer can fine-tune these settings or values according to different requirements. It should be understood that the mobile device of the invention is not limited to the configurations of FIGS. 1-5. The invention may merely include any one or more features of any one or more embodiments of FIGS. 1-5. In other words, not all of the features displayed in the figures should be implemented in the mobile device of the invention.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device with high radiation efficiency, comprising:

a ground element;

a first radiation element, coupled to the ground element;

a second radiation element, coupled to a feeding point;

a third radiation element, coupled to the feeding point;

a fourth radiation element, coupled to the ground element, wherein an antenna structure is formed by the first radiation element, the second radiation element, the third radiation element, and the fourth radiation element;

a dielectric substrate, wherein the first radiation element, the second radiation element, the third radiation element, and the fourth radiation element are disposed on the dielectric substrate;

a speaker body, wherein the speaker body has a first vertical projection on the dielectric substrate, and the first vertical projection at least partially overlaps the third radiation element; and a cable, coupled to the speaker body, wherein the cable has a second vertical projection on the dielectric substrate, and the second vertical projection does not overlap the antenna structure at all.

2. The mobile device as claimed in claim 1, wherein the first radiation element substantially has an L-shape and comprises a wide portion and a narrow portion, and the narrow portion is coupled through the wide portion to a first grounding point on the ground element.

3. The mobile device as claimed in claim 1, wherein the second radiation element substantially has a J-shape and is adjacent to the first radiation element.

4. The mobile device as claimed in claim 1, wherein the third radiation element substantially has a W-shape and is adjacent to the first radiation element and the fourth radiation element.

5. The mobile device as claimed in claim 1, wherein the fourth radiation element substantially has a straight-line shape and is coupled to a second grounding point on the ground element.

6. The mobile device as claimed in claim 1, wherein a first coupling gap is formed between the first radiation element and the second radiation element.

7. The mobile device as claimed in claim 6, wherein a second coupling gap is formed between the first radiation element and the third radiation element.

8. The mobile device as claimed in claim 7, wherein a third coupling gap is formed between the third radiation element and the fourth radiation element.

9. The mobile device as claimed in claim 8, wherein a width of each of the first coupling gap, the second coupling gap, and the third coupling gap is from 0.5 mm to 2 mm.

10. The mobile device as claimed in claim 1, wherein the antenna structure covers a first frequency band, a second frequency band, a third frequency band, and a fourth frequency band.

11. The mobile device as claimed in claim 10, wherein the first frequency band is from 600 MHz to 960 MHz, the second frequency band is from 1710 MHz to 2170 MHz, the third frequency band is from 2300 MHz to 2700 MHz, and the fourth frequency band is from 3300 MHz to 3800 MHz.

12. The mobile device as claimed in claim 10, wherein a length of the first radiation element is substantially equal to 0.25 wavelength of the lowest frequency of the first frequency band.

13. The mobile device as claimed in claim 10, wherein a length of the second radiation element is substantially equal to 0.25 wavelength of the highest frequency of the first frequency band.

14. The mobile device as claimed in claim 10, wherein a length of the third radiation element is substantially equal to 0.25 wavelength of the second frequency band.

15. The mobile device as claimed in claim 10, wherein a length of the fourth radiation element is substantially equal to 0.25 wavelength of the fourth frequency band.

* * * * *